United States Patent
Zaitsev (10) Patent No.: US 10,652,303 B2
(45) Date of Patent: May 12, 2020

(54) SCREENCAST ORCHESTRATION

(71) Applicant: Rabbit Asset Purchase Corp., San Diego, CA (US)

(72) Inventor: Timophey Zaitsev, San Mateo, CA (US)

(73) Assignee: Rabbit Asset Purchase Corp., San Diego, CA (US)

( * ) Notice: Subject to any disclaimer, the term of this patent is extended or adjusted under 35 U.S.C. 154(b) by 37 days.

(21) Appl. No.: 15/499,582

(22) Filed: Apr. 27, 2017

(65) Prior Publication Data

US 2017/0318070 A1    Nov. 2, 2017

Related U.S. Application Data (60) Provisional application No. 62/328,825, filed on Apr. 28, 2016.

(51) Int. Cl.
*H04L 29/06* (2006.01)
*H04L 29/08* (2006.01)

(52) U.S. Cl.
CPC .......... *H04L 65/608* (2013.01); *H04L 65/607* (2013.01); *H04L 65/80* (2013.01); *H04L 67/02* (2013.01)

(58) Field of Classification Search
CPC ............. H04L 63/1441; H04L 63/1433; H04L 63/0209; H04L 45/24; H04L 45/34; H04L 63/06; H04L 63/0428
See application file for complete search history.

(56) References Cited

U.S. PATENT DOCUMENTS

| | | | | |
|---|---|---|---|---|
| 6,128,649 | A * | 10/2000 | Smith | H04N 7/152 348/14.03 |
| 2004/0236777 | A1* | 11/2004 | Pardikar | G06F 21/6218 |
| 2011/0035685 | A1* | 2/2011 | Johanson | H04N 7/15 715/753 |
| 2011/0279677 | A1* | 11/2011 | Stribling | H04N 21/2743 348/157 |

(Continued)

OTHER PUBLICATIONS

Notification of Transmittal of the International Search Report and the Written Opinion of the International Searching Authority, or the Declaration for PCT/US2017/030131 dated Sep. 12, 2017.

*Primary Examiner* — Philip J Chea
*Assistant Examiner* — Wuji Chen
(74) *Attorney, Agent, or Firm* — Maschoff Brennan; Jason W. Croft (57) ABSTRACT

A method comprising by one or more computing systems of a virtual-room networking system, receiving, from a client computing device, a request to access a remote client; by the one or more computing systems of the virtual-room networking system, capturing, from the remote client, content to be presented to one or more client computing devices; by the one or more computing systems of the virtual-room networking system, encoding the captured content to be presented to the one or more client computing devices, wherein the encoding processes and converts the captured content in a format to be presented to the one or more computing devices; by the one or more computing systems of the virtual-room networking system, transmitting the encoded captured content to the one or more client computing systems.

18 Claims, 5 Drawing Sheets

(56) References Cited

U.S. PATENT DOCUMENTS

| | | | |
|---|---|---|---|
| 2012/0317485 A1* | 12/2012 | Ding | G06F 3/1454 |
| | | | 715/719 |
| 2013/0036168 A1* | 2/2013 | Upton | H04L 12/1827 |
| | | | 709/204 |
| 2013/0344470 A1 | 12/2013 | Morgan et al. | |
| 2014/0068007 A1* | 3/2014 | O'Gorman | H04N 7/147 |
| | | | 709/219 |
| 2014/0219167 A1 | 8/2014 | Santhanam et al. | |
| 2015/0039760 A1* | 2/2015 | Yoakum | H04L 65/1059 |
| | | | 709/225 |
| 2016/0014450 A1 | 1/2016 | Hulse et al. | |

* cited by examiner

RABBIT ADMIN

| DASHBOARD | CAPABILITIES | RECEIVING | AUTHORITY |

CAPABILITIES

| REGIONUS CAPTURES | REGIONUS ENCODERS | REGIONUS TRANSMITS |
| --- | --- | --- |
| 1982 / 3468 | 3816 / 5295 | 3831 / 5310 |

| CHASSISAC CAPTURES | CHASSISAC ENCODERS | CHASSISAC TRANSMITS |
| --- | --- | --- |
| 0 / 69 | 21 / 90 | 21 / 90 |

| CHASSISAD CAPTURES | CHASSISAD ENCODERS | CHASSISAD TRANSMITS |
| --- | --- | --- |
| 0 / 67 | 24 / 90 | 24 / 90 |

| CHASSISAE CAPTURES | CHASSISAE ENCODERS | CHASSISAE TRANSMITS |
| --- | --- | --- |
| 0 / 68 | 22 / 90 | 22 / 90 |

| CHASSISAF CAPTURES | CHASSISAF ENCODERS | CHASSISAF TRANSMITS |
| --- | --- | --- |
| 0 / 64 | 26 / 90 | 26 / 90 |

| CHASSISAG CAPTURES | CHASSISAG ENCODERS | CHASSISAG TRANSMITS |
| --- | --- | --- |
| 36 / 69 | 57 / 90 | 57 / 90 |

| CHASSISAH CAPTURES | CHASSISAH ENCODERS | CHASSISAH TRANSMITS |
| --- | --- | --- |
| 38 / 63 | 65 / 90 | 65 / 90 |

SCREENCAST ORCHESTRATION

PRIORITY

This application claims the benefit, under 35 U.S.C. § 119(e), of U.S. Provisional Patent Application No. 62/328,825, filed 28 Apr. 2016, which is incorporated by reference.

TECHNICAL FIELD

This disclosure generally relates to controlling a remote desktop.

SUMMARY OF PARTICULAR EMBODIMENTS

In particular embodiments, a system may allow synchronous playback from a source of information to multiple destinations of information. In particular embodiments, the system may capture the source of information, encode the source of information, and transmit the encoded source of information to multiple destinations of information.

DESCRIPTION OF EXAMPLE EMBODIMENTS

Figure 1:
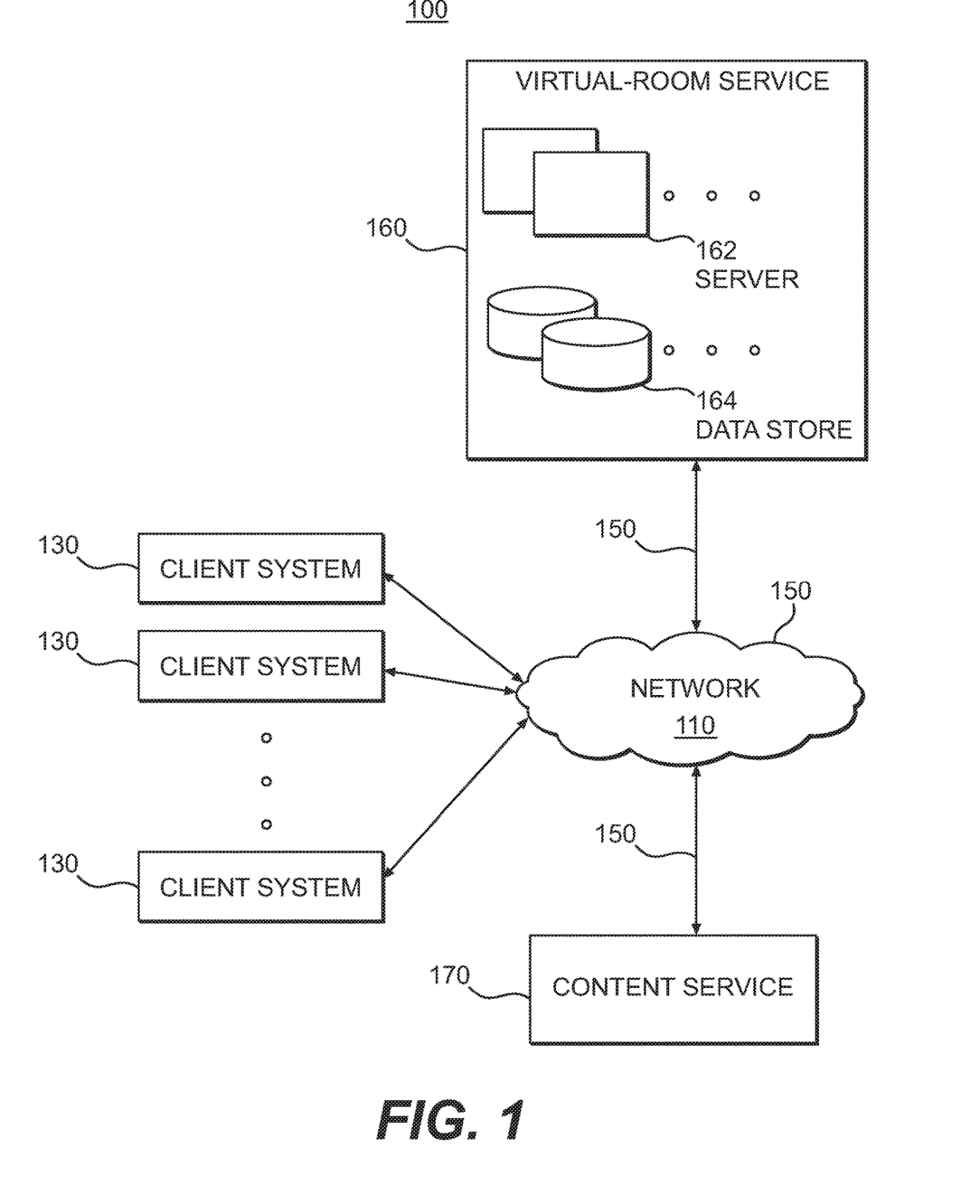
FIG. 1 illustrates an example network environment associated with a particular networking system.

FIG. 1 illustrates an example network environment 100 associated with a virtual-room service 160. Network environment 100 includes multiple client systems 130, virtual-room service 160, and at least one content system 170 connected to each other by a network 110. Although FIG. 1 illustrates a particular arrangement of particular systems, this disclosure contemplates any suitable arrangement of any suitable systems. As an example and not by way of limitation, network environment 100 may include multiple server systems 160. As another example, network environment 100 may include multiple third-party systems 170. As another example, server system 160 may be physically or logically co-located with each other in whole or in part. Moreover, although FIG. 1 illustrates a particular number of client systems 130, server systems 160, third-party systems 170, and networks 110, this disclosure contemplates any suitable number of client systems 130, server systems 160, third-party systems 170, and networks 110. As an example and not by way of limitation, network environment 100 may include multiple client system 130, room service systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

In particular embodiments, FIG. 1 may illustrate a method for hosting a virtual-room service 160 between a plurality of client systems 130, sending room information from virtual-room service 160 from a server 162 and/or data store 164 to one or more client systems 130 over network 110 which may contain third party content from content service 170. As examples only, and not by way of limitation, the following are examples of content services 170 in particular embodiments: YOUTUBE, FACEBOOK, SPOTIFY, websites, web pages, HBO GO, SHOWTIME ANYTIME, or any other similar service. One of ordinary skill in the art would realize, however that content service 170 could be any type provider. For example, the content may be delivered directly from a live feed filming a sporting event or from a handheld device.

In particular embodiments, virtual-room service 160 may host a "room" for multiple participants to view information from content service 170. In particular embodiments, the room is a virtual room where tens, hundreds, thousands, or millions of users may participate with each other. In further embodiments, each room may be assigned a remote desktop (e.g. server) of virtual-room service 160. In further embodiments, each remote desktop may be controlled by one user in each of the rooms. In particular embodiments, multiple users may control the remote desktop of virtual-room service 160.

In particular embodiments, client system 130 may access virtual-room service 160 over network 150 to obtain access to device, for example a remote desktop, server, remote computer, virtual machine, etc. In particular embodiments, upon accessing a remote desktop, client system 130 may use the accessed remote desktop as their own. For example, and not by way of limitation, upon accessing the remote desktop, client system 130 may use the remote desktop to access YOUTUBE or NETFLIX and begin streaming content. In particular embodiments, multiple client systems 130 may be connected to the same room with the user who accessed the remote desktop. In particular embodiments, all of client systems 130 in the same room may simultaneously view the content the owner of the room has accessed. In particular embodiments, server 162 may send the audio and video content of each client system 130 in the room to all of the other client systems 130 in the room. In particular embodiments, data store 164 may track any and all activity that occurs within the room, such as users preferences, the information content service 170 has provided, or any other pertinent information.

In particular embodiments, client system 130 may receive other participants audio and/or video streams whom are also in the room. In particular embodiments, virtual-room service 160 sends the participants audio and/or video streams to the other participant's client systems 130 who are in the room. In particular embodiments, such system may enable users within a room to stream the respective audio and video streams to different remote desktops located within virtual-room service 160 and to track the associations, user preferences, etc. and store such information in data store 164.

In particular embodiments, receiving audio and video streams from a remote desktop (e.g. server) may include capturing the audio and video streams from the client systems 130, sending the audio and video streams to server 162, and subsequently sending the streams to all client systems in the room. In particular embodiments, capturing the audio and video streams may include capturing information from client systems 130 microphone and camera. In particular embodiments, the captured streams may include content streamed from content service 170. As an example and not by way of limitation, the captured stream may include content streamed from a YOUTUBE video.

Links 150 may connect client system 130, room service networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME, APPLE SAFARI or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol/Secure (HTTP/S) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, ADOBE Flash combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, room service networking system 160 may be a network-addressable computing system that can host an online social network. Room service networking system 160 may generate, store, receive, and send social-networking data, such as, for example, user-profile data, concept-profile data, social-graph information, or other suitable data related to the online social network. Room service networking system 160 may be accessed by the other components of network environment 100 either directly or via network 110. As an example and not by way of limitation, client system 130 may access room service networking system 160 using a web browser 132, or a native application associated with room service networking system 160 (e.g., a mobile social-networking application, a messaging application, another suitable application, or any combination thereof) either directly or via network 110. In particular embodiments, room service networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, room service networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, room service networking system 160 may provide users with the ability to take actions on various types of items or objects, supported by social-networking system 160. In particular embodiments, room service networking system 160 may provide users with the ability to view information from content service 170 without client system initiating their own room. In particular embodiments, room service networking system 160 may determine certain information to display from content service 170 at a predetermined time and invite users to join an already existing room. For example, every Friday at 7:00 pm the system may stream a horror movie and the system may provide a notice to users that Friday at 7:00 pm a horror movie will be streamed. In further embodiments, upon logging in to the service, if the horror movie has already begun, the system may provide a notification to the user to join the Friday horror room. As another example and not by way of limitation, the items and objects may include groups or social networks to which users of room service networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in room service networking system 160 or by an external system of third-party system 170, which is separate from room service networking system 160 and coupled to room service networking system 160 via a network 110.

In particular embodiments, room service networking system 160 may be capable of linking a variety of entities. As an example and not by way of limitation, room service networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, room service networking system 160 and third-party systems 170 may operate in conjunction with each other to provide social-networking services to users of room service networking system 160 or third-party systems 170. In this sense, room service networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, room service networking system 160 also includes user-generated content objects, which may enhance a user's interactions with social-networking system 160. User-generated content may include anything a user can add, upload, send, or "post" to social-networking system 160. As an example and not by way of limitation, a user communicates posts to room service networking system 160 from a client system 130. Posts may include data such as status updates or other textual data, location information, photos, videos, links, music or other similar data or media. Content may also be added to room service networking system 160 by a third-party through a "communication channel," such as a newsfeed or stream. In particular embodiments, the system may be aware of the context of the content and may be able to further inform the user that the particular content may be explicit. In further embodiments, the system may tag the content in a specific way to make parsing through potentially explicit material more simple. This may be a beneficial way if a user is under the age of 18 and may be prompted to "Agree" to enter a particular room at their own risk.

In particular embodiments, room service networking system 160 may include a variety of servers, sub-systems, programs, modules, logs, and data stores. In particular embodiments, room service networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Room service networking system 160 may also include suitable components such as network interfaces, security mechanisms, load balancers, failover servers, management-and-network-operations consoles, other suitable components, or any suitable combination thereof. In particular embodiments, room service networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories.

A web server may be used for linking room service networking system 160 to one or more client systems 130 or one or more third-party system 170 via network 110. An API-request server may allow a third-party system 170 to access information from room service networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by room service networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, a first computing device may access a second computing device using a remote desktop service. A connection is initiated on the second computing device to connect to the first computing device and a remote desktop client may be initiated on the second computer. A request may then be created for a remote desktop protocol session with the first computing device using an operating environment where the operating environment obtains its settings from an operating environment configuration file. In particular embodiments, the request may be communicated through a cloud service to the first computing device. In further embodiments, an authorization is received to begin the desktop protocol session from a remote desktop server application on the first computing device through the cloud service and a channel is established from the second computing device to the first computing device through the cloud service. Remote desktop protocol data flow begins from the first computer to the second computer through the cloud services where a second computer display and operating system experience is virtually the same as a first computer and all operations on the first computer are available on the second computer by using the second computer display.

For example, a request for a remote desktop protocol session with the first computing device may be created using a particular operating environment. The operating environment may be spread over a network and parts, which may be spread over the network and may be accessed from the various network nodes as needed. In further embodiments, other nodes in the operating system may access different parts of the operating environment from an of the nodes on the network.

In particular embodiments, the request for a remote desktop protocol session may be communicated through a cloud service to the computing device. The cloud service may represent a service or application that controls data through a widely dispersed network, such as the internet. The response to the request may be handed in any number of ways known in the art. In particular embodiments, a display is created on the first computing device where a user may select to allow a user to remotely control the first computing device. In another embodiment, the first computing device has a list of acceptable second computing devices that have standing permission to remotely access the first computing device.

In particular embodiments, an authorization step may occur where the desktop protocol session from a remote desktop server application may be received on the first computing device through the cloud service. In further embodiments, the first computing device may be a node in the network cloud and may receive the request of a remote connection.

In further embodiments, a channel may be established from the second computing device to the first computing device through the cloud server. Assuming permission was granted, a channel may then be created. In particular embodiments, the channel may be created using SSL or through any other appropriate technology known in the art.

In particular embodiments, a remote desktop protocol data flow may being from the first computing device to the second computing device through the cloud services. In further embodiments, as a result, the second computing device display may be virtually the same as the first computing device display. In particular embodiments, any operation on the first computing device may be available on the second computing device by using the second computing device display. The display may be a copy of the graphical elements of the first display making the display on the second computing device to be viewed as virtually exact as the first display.

In particular embodiments, in order to for the computing device to be remotely accessed, the first computing device may have to register with a remote access gateway. In particular embodiments, the registration may take a variety of forms and use hardware or software applications.

In particular embodiments, a user remotely accessing a second computing device may access such device by use of a touch screen or similar device. For example, a user may access a remote desktop through a cellphone, PDA, television, touch screen device, or any other suitable device, however such device may not have the standard mouse and keyboard configuration. In particular embodiments, a user may still navigate the remote device by use of a touch screen or any other means even though the user's device does not have matching means of navigation.

In particular embodiments, a display device may include a user interface (UI) displayed on screen and connected to the processor. The screen may be configured to display text, digital images, or video. The screen may be configured to be user interactive (e.g., recognize and accept user inputs to interact with device software). The screen may include any suitable type of display, for example, an electrophoretic display, a liquid crystal display (LCD), a light-emitting diode (LED) display, an organic light-emitting diode (OLED) display, an organic field-effect transistor (OFET) display, or other suitable display. This disclosure contemplates any suitable type of display configured to be user interactive. In particular embodiments, the screen may be a touch screen and able to receive gestures from a user. In particular embodiments, the gesture may include a single-touch interaction or a multi-touch interaction.

In particular embodiments a remote desktop protocol, or any other suitable method known in the art, may be used for video conferencing between a plurality of participants. In particular embodiments the video conferencing may include sending conversation group information from a managing server (or remote desktop) to a second device. In particular embodiments, a managing server (or remote desktop, server, etc.) may send multiple participants audio and video streams to a set of user devices. In particular embodiments, this may allow users within a group to stream a certain audio clip, view web content, or simply use a remote desktop as a group of individuals. In particular embodiments, one group user holds the "remote" and has "control" over the remote desktop. In particular embodiments, the user with the "remote" is able to choose or select content for the group of participants to view. In particular embodiments, such methods may facilitate video conferring, video chatting, or any other suitable audio-video communications between a plurality of users. In particular embodiments, the user holding the "remote control" may control the remote desktop by a touch screen. In particular embodiments, the user controlling the "remote control" may use an electron device, such as a cellphone with a touch screen, to control a remote desktop. In particular embodiments, the user's device may be a touch screen device, however the remote desktop may not be a touch screen device. In particular embodiments, a touch screen device may have controls to control a remote non-touch screen device.

In particular embodiments, each group of participants may be assigned to a particular remote desktop, server, etc. for their current session. In further embodiments, the group of participants may be assigned to different devices. In further embodiments, there may be hundreds, thousands, millions, or billions of chat room or groups in which a user may join. In further embodiments, each "room" where a user or groups of users enter may support audio and/or video sharing between an unlimited number of participants.

Figure 2:
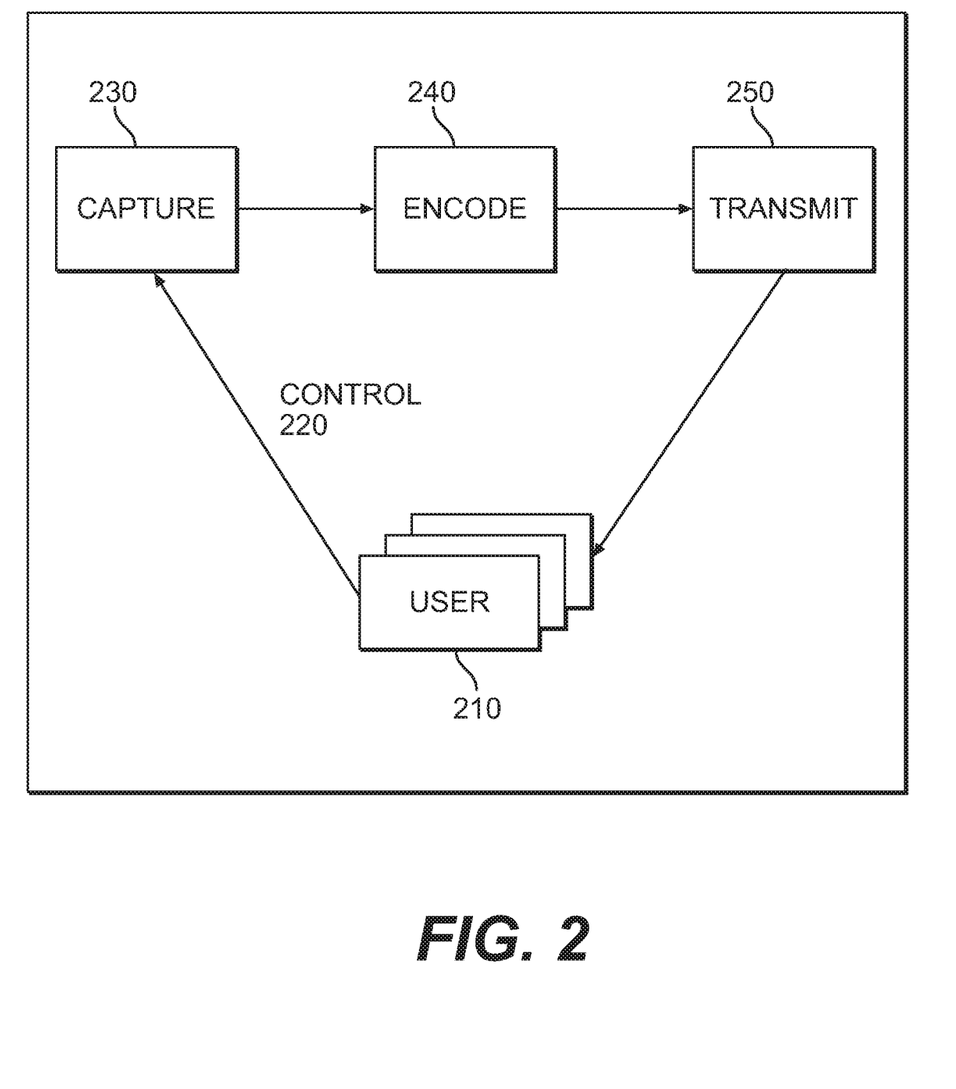
FIG. 2 illustrates an example computer system capturing, encoding, and transmitting synchronous information to a plurality of destinations.

FIG. 2 illustrates an example computer system capturing, encoding, and transmitting synchronous information to a plurality of destinations. In particular embodiments, a system may allow synchronous playback from a source of information to multiple destinations of information. In particular embodiments, the system may capture the source of information, encode the source of information, and transmit the encoded source of information. In particular embodiments, capture system 230 may be controlled 220 from user 210. In particular embodiments, user 210 may be any device capable of sending information to a server.

In particular embodiments, capture system 230 may be a server that user 210 interacts. In further embodiments, user 210 may control 220 capture system 230. In particular embodiments, capture system 230 may be viewed, controlled, or interacted with by multiple users. In particular embodiments, the viewing, controlling, or interaction may be synchronous with other users 210. In particular embodiments, the operating system of capture system 230 may be configured for user 210. For example, upon user 210 accessing capture system 230, the operating system of capture system 230 may grant user 210 specific rights and privileges. For example, capture system 230 may grant user 210 the ability to access certain applications or software to use the system (e.g., access to www.youtube.com to view and play videos). In further embodiments, capture system 230 operating system may limit certain rights and privileges for user 210. For example, capture system 230 may deny user 210 from accessing or running certain software on capture system 230 that is not white listed. In particular embodiments, upon user 210 attempting to run or access unpermitted software or applications, capture system 230 may terminate user 210 connection.

In particular embodiments, capture system 230 may act as the relay between user 210 and encoding system 240 and transmitting system 250. In particular embodiments, capture system 230 may capture the audio and video of the operating system in real-time. In further embodiments, capture system 230 may optimize the captured audio and video before sending the captured data to encoding system 240. In further embodiments, capture system 230 may encode the audio and video before sending the captured data to encoding system 240. In particular embodiments, capture system 230 may accept control 220 from authorized users. In particular embodiments, capture system 230 may deny control 220 from malicious inputs.

In particular embodiments, capture system 230 may be comprised of hundreds, thousands, or millions of servers (e.g., remote desktop) located across a state, country, or globe. In particular embodiments, user 210 may be assigned to control 220 a specific server in capture system 230. In particular embodiments, user 210 may be assigned to a server in capture system 230 based on geo-graphic location, specific hosts, a regional request, speed, time, bandwidth, or capacity. In particular embodiments, the servers of capture system 230 may be clustered with a zone. In further embodiments, multiple zones may make up a region. In particular embodiments, upon an outage or general system failure with a particular server, capture system 230 may assign user 210 a new server to control 220. In particular embodiments, one user 210 may be assigned to control 220 one server of capture system 230. In further embodiments, multiple users 210 may be able to control 220 a single server of capture system 230. In particular embodiments, the server of capture system 230 may be assigned to capture one video and one audio stream at a given time.

In particular embodiments, capture system 230 may ensure privacy of users 210 by writing data to temporary volatile and non-retrievable memory. In further embodiments, upon user 210 terminating connection with a particular capture server of capture system 230, capture system 230 may erase all data and memory of user's 210 session.

In particular embodiments, captured audio and video may be sent from the captured device in either a RAW format or compressed with as little delay as possible (i.e., as close to real-time as is possible while maintaining quality). In particular embodiments, when encoding system 240 receives the audio or video it may act to ensure it is in the right format for decompressing the data as it may be necessary to re-encode the data into multiple formats and resolutions. In particular embodiments, various formats and resolutions may allow for the delivery of the most optimal signal to the end user. For example, one input feed may be captured and encoded into VP8 (primarily for chrome) and H.264 (Other supporting browsers e.g. Firefox) at any number of resolutions (low, medium, and high as an example), with various frame rates (e.g., 12, 15, 18, 24, 30, 60, etc.). In particular embodiments, have too little bandwidth may result in a poor experience and the system may automatically adjust to and restrict the options based on the systems own state.

In particular embodiments, the interaction and security associated with control 220 may be handled by user 210 requesting control of the server and capture system 230. In particular embodiments, upon user 210 requesting control 220 from streaming system 205, a key may be returned to user 210 and updated on capture system 230. In particular embodiments, if any connection is made that does not contain the key, does not provide a valid handshake, or provides invalid data during a connection, user's 210 access may be revoked.

In particular embodiments, captures system 230 may automatically adjust the size and layout of the displayed operating system to fit users 210 keyboard layout. In further embodiments, capture system 230 may automatically format the operating system to users 210 country of origin and language preferences. In further embodiments, capture system 230 may configure the operating system for user 210 based at least in part on user's 210 profile. In particular embodiments, capturing system 230 may scale the display to user's 210 device. In further embodiments, capturing system 230 may interpret mouse and keyboard input from user 210. In particular embodiments, the mouse and keyboard inputs may be interpreted, translated, and sent in the smallest possible format to the particular server of capture system 230. In further embodiments, the particular server receiving the inputs in capture system 230 may apply them to the appropriate operating system.

In particular embodiments, control from the user's experience may be established directly to capture system 230. In further embodiments, this may allow the least latency in control. In particular embodiments, the user gains control of a remote device in capture system 230, at which point all actions may be captured by the system, which are ultimately streamed. In particular embodiments, upon capture system 230 detecting it is being controlled, capture system 230 may translate the controlling signals to move the mouse or push keys on the keyboard for the user. In further embodiments, these controls may be treated as changes to the video feed and may be sent to encoding system 240 and transmit system 250, and thus back to the user.

In particular embodiments, the total time from action to the user (e.g., keystroke, mouse movement), to the user seeing the interaction may be calculated by the following formula: (Latency and accuracy of sending user input from User's computer to the Capture server)+(Translation of control information and signaling to the operating system)+(Sending of new damage [change to capture] to Encoder)+(Encoding of signal)+(Delivery of signal payload to Transmit)+(Transmission to user)+(Latency and accuracy of delivery to user)+(Rendering on the user side)=Time to see a change user made controlling a capture. In particular embodiments, the system attempts to make this formula equal as close to 0 milliseconds as possible.

In particular embodiments, encoding system 240 may be in between capture system 230 and transmit system 250. In particular embodiments, encoding system 240 may receive audio and video data. In particular embodiments, the audio and video data may be received at high bitrates. In further embodiments, encoding system 240 may process and convert the audio and video in real-time and generate output streams to be consumed by end users through transmit system 250. In particular embodiments, the encoders of encoding system 240 may run on any hardware. In further embodiments, the encoders of encoding system 240 may be located near capture system 230. Placing encoding system 240 near capture system 230 may improve performance because of the size of the payloads being transmitted from capture system 230 to encoding system 240. In further embodiments, encoding system 240 may receive well defined audio and video sources and then encode the received data into one of many supported formats. In particular embodiments, not all encoders of encoding system 230 are equal and the decision of hardware to support the needs of the outputted formats may determine the makeup of the encoders for encoding system 240.

Figure 3:
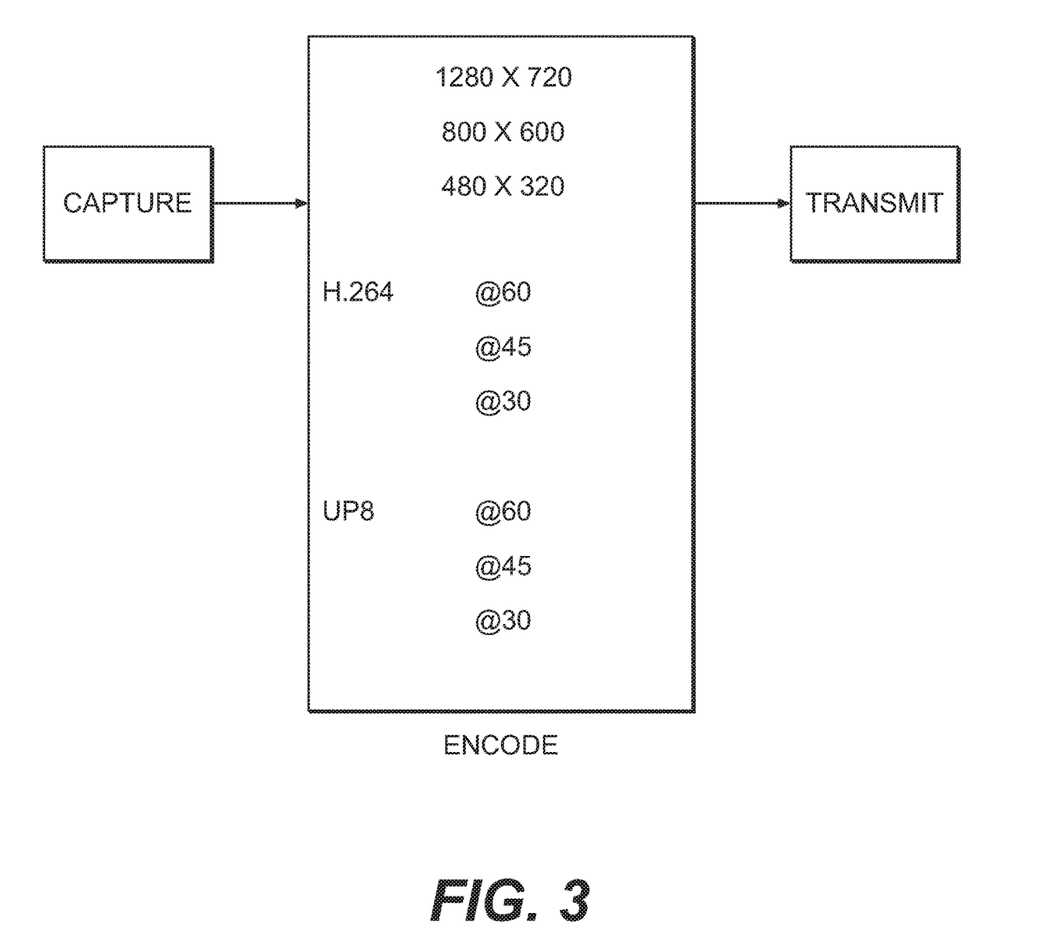
FIG. 3 illustrates an example of different resolutions and encoding rates that may be employed.

In particular embodiments, the encoders of encoding system 240 may output multiple levels of quality. The qualities may range from ultra-low quality and low resolution to ultra-high definition depending on the available resources of streaming system 205. For example, if only a few users 210 are using streaming system 205, encoding system 240 may encode the received data to transmit ultra-high definition. On the other hand, if streaming system 205 has reached near maximum capacity, the qualities may be lowered such that streaming system 205 can support the large amount of users 210 on streaming system 205. FIG. 3 illustrates an example of different resolutions and encoding rates that may be employed.

In particular embodiments, during the conversion process, the encoding of encoding system 240 may need to generate origin frames (i.e., key frames), which may allow a new user 210 who joins the stream (i.e., the channel) to begin receiving the audio and video data. In further embodiments, the origin frames may be synchronized to the input stream. In particular embodiments, the generation of origin frames may allow user 210 to seamlessly switch qualities from ultra-low to ultra-high without resynchronization. In further embodiments, quality levels may be variable and may be customized in real-time based on the resources available to the region as a whole.

In particular embodiments, encoding system 240 may receive one input source at almost the same time as another, the output of all the required formats (i.e., low, medium, high, frame adjustment, etc.) may all be encoding at the same time the input is received and then output at substantially the same moment, the output to the user change in quality (low quality, medium quality, high quality) to ensure a seamless user experience and to prevent any tearing that occurs in the user's stream. For example, unlike YouTube, where the changing of quality may cause buffering changing, the quality in the disclosed system does not cause buffering because all of the streams are available in real time.

In particular embodiments, transmit system 250 may receive data from a particular encoder of encoding system 240 and then transmit the data to end users 210. In further embodiments, transmit systems 250 may transmit the data to users 210 over webRTC. In particular embodiments, transmit system 250 may handle the negotiation of new users as well as the exchange of data over webRTC. For example, when a new user 210 joins streaming system 205, transmit system 250 may signal encoding system 240 to generate key frames of specific qualities. In further embodiments, when a new user 210 joins streaming system 205, transmit system 250 may handle and otherwise provide the best possible error and loss concealment to the other users 210.

For example, using the standard RTCP signaling, transmit system 250 may exchange information with another receiving peer or user. In particular embodiments, transmit system 250 may emit statistics to the receiving peer or user and the peer or user may also respond with their own statistics. In particular embodiments, using the combined statistics from the peer and the server, the system may be able to adjust the signal that is being sent. One of ordinary skill in the art would realize there are many options to create the best quality, ranging from forward error correction on audio and video, to lowering the quality, to not sending video if it is too destructive for the experience.

In particular embodiments, to provide data to user 210 streaming system 205 may provide the most suitable composition of capture system 230, encoding system 240, and transmit system 250. In particular embodiments, the selection of components in streaming system 205 may be performed through multiple filters. In particular embodiments, these filters may be, but are not limited to, geographic distribution; specific host, zone, and region request; capacity within a region; the type of region (e.g., scalable or static) depending on the auto scaling mode. In particular embodiments, during the selection process, statistics may be collected ranging from setup time to number of failed capabilities detected during setup. In further embodiments, the system may be capable of adjusting the amount of forward error correction for each particular user. For example, a particular user who may have a near perfect network may suffer from the extra data sent for complete forward error correction, while another user with a very poor network may need extra data to recover from losses. In particular embodiments, an audio codec (e.g., OPUS) may include a forward error correction that may be used to enhance a receiving signal. In further embodiments, more error corrections results in larger audio packets to help improve on the fly adjustments.

In particular embodiments, upon selection of a suitable pipeline, the components of the pipeline may be reserved and their associated metadata herein known as a 'lock' may be automatically enforced. In further embodiments, no other pipelines may claim these capabilities unless the locks are removed. This may ensure the correct and accurate setup of streaming system 205 and also allow for the secure disposal of used capabilities (i.e., to prevent data contamination and leaking, and to ensure user safety). In particular embodiments, the pipeline may be initiated and assigned to the server of capture system 230 allowing user 210 to access and control the system.

In particular embodiments, during the "lifetime" of the room or stream, a capability of streaming system 205 may fail to respond to external stimulus or may be detected by the system as "dead" for any number of reasons. In particular embodiments, upon the occurrence of this situation, streaming system 205 may properly dispose of the previously attached and unresponsive capabilities and attempt to rebuild the pipeline with similar capabilities. In particular embodiments, the conditions for a successful pipeline rebuild may involve a new capability existing within the region. In further embodiments, if no capability is present within the pipeline's region and sufficient time has passed where the system may be unsure of a successful recovery, the entire pipeline may be destroyed and a new pipeline may be built using all new components. In further embodiments, once complete, the pipeline may be restored to the room or stream and the user experience may continue with little to none interruption. In further embodiments, the user experience may be restarted with a new room or stream.

In particular embodiments, there may be a situation where streaming system 205 may be unable to generate a valid pipeline across all regions. In particular embodiments, user 210 may be required to queue to receive a room or stream. In further embodiments, queuing may be a process by which any user 210 wishing to initiate a room or stream under resource constrained conditions is placed behind user 210 who previously requests a room or stream. In particular embodiments, while in the queue the time user 210 may be displayed to user 210. In further embodiments, streaming system 205 may provide an approximation to the length of time each user 210 may have to wait (or has been waiting) to receive a room or stream. In further embodiments, as discussed above, the pipeline may fail from time to time, and for users 210 who were in a pipeline, but then failed, may receive priority access to newly available capabilities within their region putting them ahead of other users 210 in the queue.

In particular embodiments, streaming system 205 may be distributed across multiple regions. A region may be the collection of pipeline capabilities. In particular embodiments, each region must have a mechanism for managing streaming system 205 to manage each capability and assemble pipelines. In particular embodiments, data on each capability and pipeline is stored within the region and may not be exposed to the rest of the system. In further embodiments, this data is stored across multiple or all regions. In particular embodiments, encoder processes do not need access to the public internet. In further embodiments, the capture process may have access to the public internet or it may access some internal network content, however such access does not require a public IP because the requests may be proxied through the transmit capabilities when they are setup as gateways.

In particular embodiments, a region may be confided by space, size, and power. For example, the smallest region may be considered the least powerful computer capable of running streaming system 205. On the other hand, larger regions may be more dense setups that may include each capability of the pipeline being broken apart across numerous servers to achieve manageable density.

In particular embodiments, each region may have a type of lifecycle management which may ensure processes are responsive and working (e.g., assign in repairs of the pipeline). In further embodiments, each region may contain at least one of each type of capability (i.e., capture system 230, encoding system 230, and transmit system 240) and access to the internet in the form of at least one public internet per transmit server. While more than one public address assigned to a transmit server may make the system more manageable, it is not required. In particular embodiments, encoders of encoding system 240 may not need access to the public internet. In further embodiments, the capture servers of capture system 230 may have access to the public internet, but may not require public internet provider security as the servers may proxy their requests through the transmit capabilities of transmit system 250 when they are setup as gateways.

In particular embodiments, regions may come under attack from DOS/DDOS or any other outage based event given they require public IP addressing. In particular embodiments, to help manage this issue, the orchestration system may take into account a variety of small deployments as well as potentially auto scaling environments.

Figure 4:
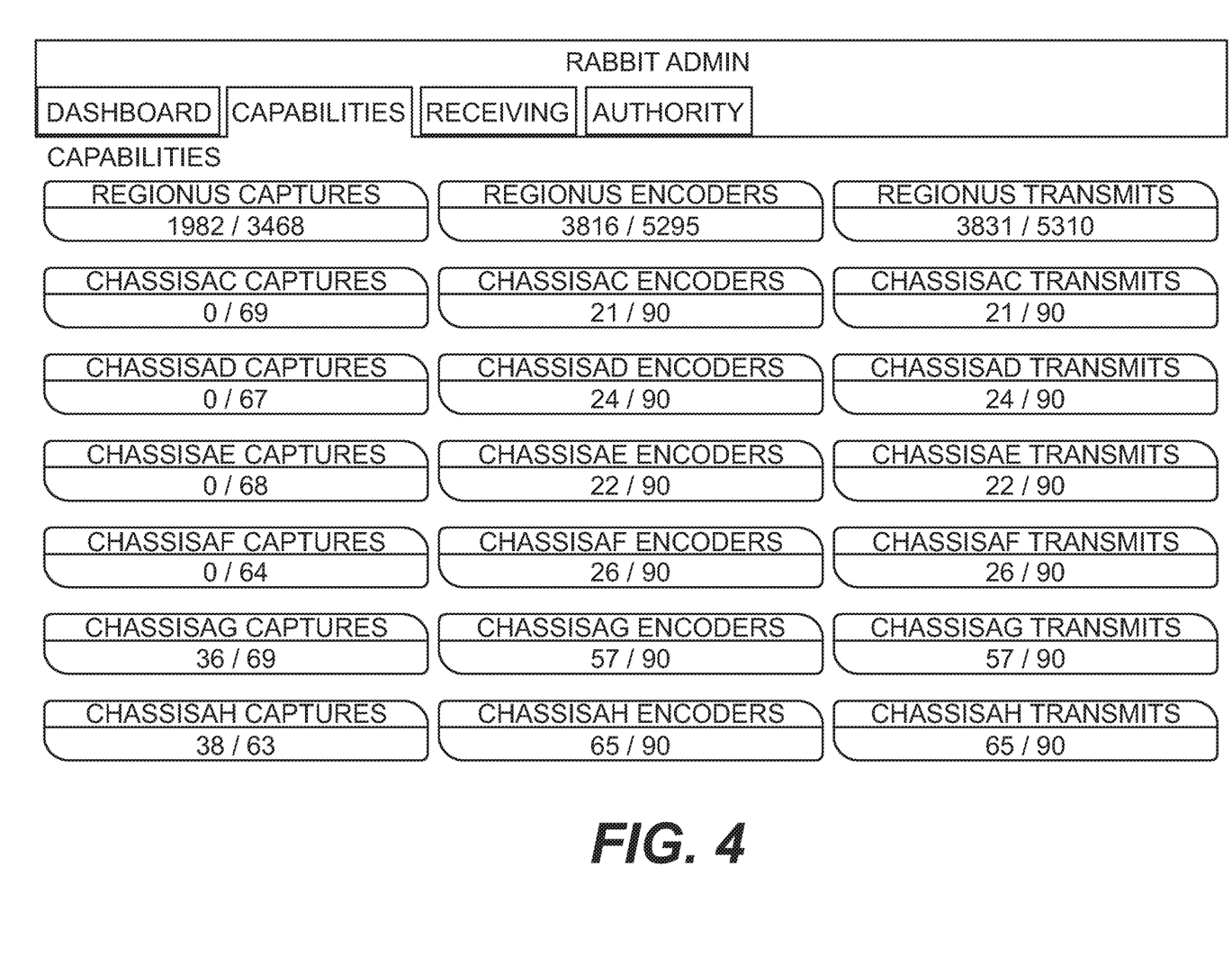
FIG. 4 illustrate an example of managing servers.

FIG. 4 illustrate an example of managing servers in streaming system 205. In particular embodiments, regions may manage themselves in terms of capabilities, but the orchestration system may be configured such that it is able to reach each region to perform pipeline requests and to associate a pipeline with a stream or room. In particular embodiments, if a particular region goes offline (i.e., main system loses connectivity with the region), users 210 that are receiving a cast or stream may transition into a degraded state. In further embodiments, loss of a particular region may result in quality adjustment becoming limited. In particular embodiments, users 210 who may experience a failed pipeline state may not be able to receive updates on new or repaired capabilities entering the pipeline until the connection with the main orchestrator is restored.

In particular embodiments, and with reference to FIG. 4, the orchestration process of assigning users 210 to particular servers may involve determining the amount of available space in a particular region. In particular embodiments, streaming system 205 may continually orchestrate the servers such that users 210 receive an optimal user experience. In particular embodiments, the orchestration process allows for state to be scaled across multiple servers without the concern of the amount of users using streaming system 205. In the event streaming system 205 determines capacity has been reached, the quality may be reduced to allow more users to join streaming system 205.

In particular embodiments, system 205 may be viewed as a orchestration of the users 210, capture system 230, encoding system 240, and transmit system 250. The orchestration process may include determining the capabilities and resourcing of each of the systems. For example, determining a specific host, zone, region, the limitations, and locks. In further embodiments, the orchestration process may include the distribution of small, medium, or large groupings of servers. In particular embodiments, the orchestration process may include the ability to be viewed as fault tolerant (i.e., capable of recovering lost components), a standalone system (i.e., ability to lose connection to the main servers), queueing (e.g., handing situations when the system may be at or near capacity).

In particular embodiments, capture system 230, may determine and/or handle security issues, real time capture of audio and video, control from an individual or multiple users, quality (e.g., frame rate), and the secure distribution of artifacts to capture with the ability to update.

In particular embodiments, system 205 may include infinite streaming sources (e.g., VOD sources, game truck feeds, movie studios), may preserve error correction data across multiple feeds (e.g., to enrich future experiences), monitoring capabilities (e.g., tracking the state of thousands of machines), and analytics (e.g., the discovery of trending and rich content).

In particular embodiments, receiving participant audio and video streams from the set of user devices at a set of streaming servers functions to receive the audio and video streams that are associated with user identifiers (e.g., the audio and video stream for a user). The audio and video streams for participants of a given conversation group can be received at different streaming servers, or can be received at the same streaming server. The audio stream and video stream for a first user identifier are preferably received at the same streaming server, but can alternatively be received at different streaming servers. The streaming server that receives the audio and video streams of the first user is preferably assigned by the managing server upon user identifier sign-on (e.g., based on streaming server availability, streaming server physical proximity to the user, etc.), but can alternatively be permanently assigned to the user identifier, assigned based on the physical geographic location of the user or user connection, assigned based on any other suitable user metadata, or otherwise determined. Receiving the audio and/or video streams can additionally include buffering the audio and/or video stream, performing error correction on the audio and/or video stream, retransmitting lost packets, or otherwise processing the received audio and/or video stream. Receiving the audio and video streams can additionally include synchronizing the audio and video streams at the streaming server, for example based on the timestamps associated with each audio and video frame. Receiving the audio stream from a plurality of devices can additionally include mixing one or more audio streams (e.g., all the audio streams, a subset of all audio streams received at the server, only audio streams that were received from a native audio input device, etc.) into a room chatter stream. However, receiving the audio and video stream can include processing the audio and/or video stream in any other suitable manner.

Receiving audio and video streams preferably includes capturing the audio and video streams by the device, sending the audio and video streams to a server, and receiving the audio and video streams at the streaming server. Capturing the audio and video streams preferably includes capturing the audio and video streams from a microphone and camera associated with a user device, respectively. Alternatively, the audio and video streams can be captured from the audio and video streams of shared content. In one variation, the shared content includes content streamed from the Internet, wherein the captured audio stream is the streamed audio of the content, and the captured video stream is the streamed video of the content. More preferably, the shared content can be directly streamed from a third party source (e.g., from the Youtube servers) to the streaming server and subsequently to the device. In another variation of the method, the shared content includes content native to the device (e.g., an native application run on the device), wherein the captured audio stream is the audio stream generated by the native application and/or an audio stream captured from the microphone, the audio from the device itself (e.g., audio stored on the device, audio from a separate application on the device, etc.), and/or audio captured from a digital default audio output. The captured video stream can be captured from the native application to be shared through an API or other programming interface. Sending the audio and video streams to the server can include the device sending the captured audio and video streams wirelessly to the server (e.g., through WiFi, cellular networks, Bluetooth, etc.) or over a wired connection to the server (e.g., LAN connection). The audio and video streams can alternatively be sent using any suitable data transfer technologies. Sending the audio and video streams can additionally include compressing the audio and video streams, imbedding or associating data (e.g., metadata, such as an identifier, the network conditions of the device connection, etc.) with the audio and video streams, or otherwise processing the audio and video streams. The audio and video streams can additionally be processed. For example, echo cancellation can be performed on the audio stream, and video filtering, such as smoothing (e.g., frame rate adaption), can be performed on the video stream. The audio and video streams are preferably sent as two separate streams, but can alternatively be sent together. The audio and video streams are preferably sent through a native application running on the device, but can alternatively be sent by an application or a set of applications installed by the user or a third party, or through an external hardware device or application. The server preferably receives the audio and videos streams, and can additionally decompress the audio and video streams, extract any imbedded information, or otherwise process the received audio and video streams.

In particular embodiments, sending the participant audio and video streams from the set of streaming servers to the user device in response to receipt of a streaming request sent from the user device functions to send the audio and video streams of a participant of the conversation room or conversation group to the device. The streaming request includes the user identifiers for which the audio and video streams are to be sent. The streaming request can additionally include an audio and video stream quality selection (e.g., wherein the streaming server processes the audio and/or video to reduce quality for faster streaming and/or lower bandwidth consumption), wherein the quality selection can be specific to a requested user identifier (e.g., audio and video of a first quality is requested for a first user identifier and audio and video of a second quality is requested for a second user identifier), specific to a subset of requested user identifiers, or universal to all user identifiers. The streaming server preferably sends the audio and video streams corresponding to the requested user identifiers to the device from which the request was received, and can additionally process the audio and/or video stream to meet the parameters received in the request. The streaming request can additionally include a request for an ambient audio stream, wherein the streaming server can select an ambient audio stream or track from digital memory and send the ambient audio stream or track to the device. The streaming request can additionally include a request for the room chatter stream, wherein the streaming server can additionally send the room chatter stream to the device. The audio and video streams are preferably streamed from the set of streaming servers, but can alternatively be streamed from any other suitable server. Alternatively, the audio and/or video stream from a first device associated with a first user can be relayed by one or more streaming devices to the receiving devices. The audio and/or video stream is preferably streamed as a full stream, but can alternatively be divided into segments (e.g., chunked). Processed audio and/or video streams are preferably sent to the device, but the audio and/or video streams can alternatively be sent in raw form (e.g., as received). The audio and/or video streams can be mixed with other audio and/or video streams, respectively, by the streaming server to form composite audio and/or video streams. The composite audio and/or video stream is preferably mixed prior to request receipt, but can alternatively be mixed in response to request receipt, wherein the composite audio and/or video stream can be mixed according to mixing instructions within the request. The composite audio and/or video stream is preferably sent to the device, but the audio and/or video streams can alternatively be sent as independent streams. The component audio and/or video streams within a composite audio and/or video stream are preferably inseparable from the other component audio and/or video streams. Alternatively, the composite audio and/or video stream can be tagged with metadata or otherwise augmented with information about the component audio and/or video streams, such that the device can remove or adjust one or more components of a mixed stream after receipt. Different composite audio and/or video streams can be sent to different devices, or the same composite audio and/or video stream can be sent to multiple devices.

In particular embodiments, presenting the audio and video streams at the device functions to display the one or more video streams to the user and to play the room chatter stream to the user. Presenting the audio stream to the user preferably includes playing the final stream from an audio output connected to the device, such as a speaker. The final stream preferably includes the room chatter stream and can additionally include an ambient audio stream, and/or individual audio streams of conversation group participants. For example, when the user is not an active participant of any conversation group, the final stream includes the room chatter stream and the ambient audio stream. In response to a user selection of a conversation group, the final stream is dynamically remixed such that the participant audio streams of the selected conversation group are audible and clear (e.g., by including the participant audio streams in the final stream, by dampening the participant audio streams less than before, etc.). One or more retrieved video streams are preferably rendered on a display output connected to the device. The video streams preferably include at least one representative video for each of the displayed conversation groups. The number of displayed conversation groups can be less than or equal to the number of conversation groups for which participant video is retrieved. Alternatively, the device can dynamically request the video of participants in a conversation group from the respective streaming servers in response to receipt of a user selection of the conversation group. The video for all participants within an active conversation group (e.g., a conversation group in which the user is an active participant) is preferably displayed, while a composite video for participants within a non-active conversation group is preferably displayed. The conversation group focus is preferably adjusted in response to receipt of a user selection, wherein the selected conversation group becomes the active conversation group and other conversation groups become inactive conversation groups. However, the audio and video can be presented in any other suitable manner.

In particular embodiments, the method can additionally include synchronizing the audio stream with the video stream. More preferably, the method includes synchronizing the video stream to the audio stream, wherein the audio stream is prioritized (e.g., video frames are dropped or frozen to match the audio frame). However, the video can be prioritized, wherein audio frames are dropped or frozen until the audio frame timestamp matches the video frame timestamp. The audio and video streams are preferably synchronized by the device, but can alternatively be synchronized by the streaming server. The device is preferably capable of determining the network conditions of the device and/or the network conditions of the streaming devices, and delays the audio or video stream accordingly, such that the audio stream and video stream are substantially in sync. Alternatively, and/or additionally, the server can determine the network conditions and/or delay the audio or video stream. The device or server preferably identifies that the audio and video streams are from the same device based on data imbedded in the stream, such as a MAC address, SSRC (synchronization source identifier) or another identifier. The device or server can additionally multiplex the audio and video over one port to reduce the operating system overhead.

The network conditions of the device are preferably determined based on data imbedded within the stream (e.g., from metadata), but can alternatively determine the network conditions of the device from the frequency and number of packets received from the device. In one variation, each audio and video frame is time stamped by the device when it is streamed. The device preferably maintains a buffer of the audio and video frames, and selectively displays the synchronous audio and video frames. Asynchronous audio and video frames (e.g., audio or video frames that do not have a concurrent counterpart) are preferably not displayed on the device, wherein the skipped audio frame is preferably replaced with a default signal (e.g., silence). The audio is preferably subsequently passed through a mixer to obtain the audio parameters (e.g., gain, etc.) to smooth the transition back to the streamed audio frames. The audio stream is preferably synchronized with the video stream by the device, but can alternatively be synced by the streaming server or the state server. In one variation of the method, the streaming server receives the audio stream and video stream from the device, synchronizes the video stream to the audio stream, and sends the synchronized streams to the state server. In another variation of the method, the streaming server receives the audio and video streams and sends the streams to the device, wherein the device synchronizes the audio and video streams.

Figure 5:
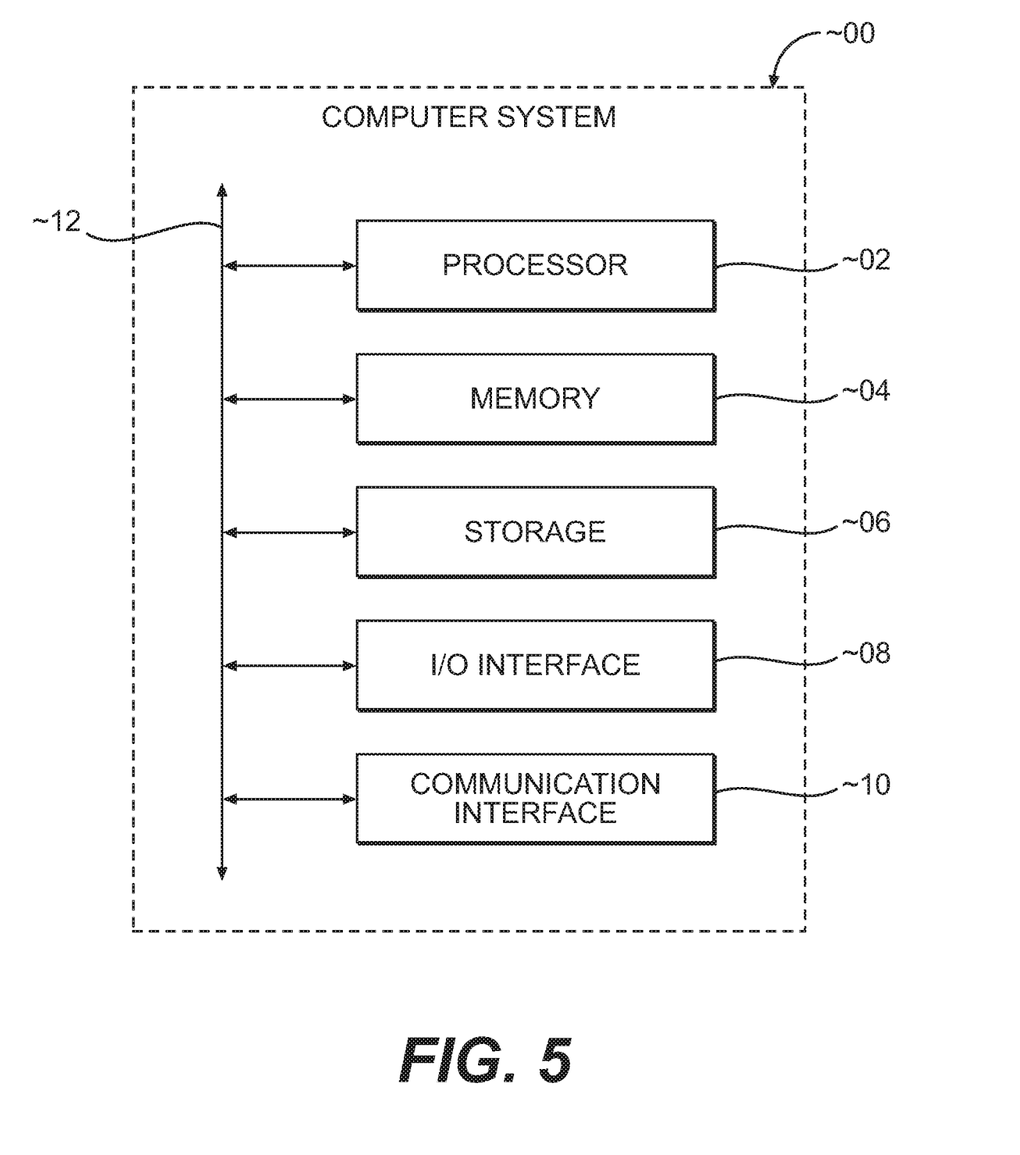
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

What is claimed is:

1. A method comprising:
   by one or more computing systems of a virtual-room networking system, receiving, from a client computing device, a request to access a remote client;
   by the one or more computing systems of a virtual-room networking system, selecting a first set of a plurality of pipeline components through which to provide the client computing device access to the remote client, comprising:
      selecting, based on one or more first factors, a first one of a plurality of capture computational resources, wherein the one or more first factors comprise one or more of a geographic location of the client computing device, a capacity of the plurality of capture computational resources, and a number of failed capabilities of the plurality of capture computational resources;
      locking the first one of the plurality of capture computational resources;
      locking the first one of the plurality of encode computational resources;
      locking the first one of the plurality of transmit computational resources;
      selecting, based on one or more second factors, a first one of a plurality of encode computational resources; and
      selecting, based on one or more third factors, a first one of a plurality of transmit computational resources;
   by the one or more computing systems of the virtual-room networking system, capturing, from the remote client and using the selected first capture computational resource, content to be presented to one or more client computing devices;
   by the one or more computing systems of the virtual-room networking system, encoding using the selected first encode computational resource the captured content to be presented to the one or more client computing devices, wherein the encoding processes and converts the captured content in a format to be presented to the one or more client computing devices;

by the one or more computing systems of the virtual-room networking system, transmitting using the selected first transmit computational resource the encoded captured content to the one or more client computing systems.

2. The method of claim 1, wherein the remote client is a remote desktop.

3. The method of claim 1, wherein the remote client is controlled by the client computing device.

4. The method of claim 3, wherein each of the one or more client computing devices is associated with a particular user of the virtual-room networking system.

5. The method of claim 1, wherein the content to be presented to the one or more client computing devices contains one or more audio streams and one or more video streams.

6. The method of claim 1, wherein the encoding further comprises:
   by the one or more computing systems of the virtual-room networking system, determining a current system capacity;
   by the one or more computing systems of the virtual-room networking system, processing and converting the captured content into a higher quality format when the current system capacity is below a pre-determined threshold.

7. The method of claim 1, wherein the one or more second factors comprise one or more of the geographic location of the client computing device, a capacity of the plurality of encode computational resources, and a number of failed capabilities of the plurality of encode computational resources.

8. One or more computer-readable non-transitory storage media in one or more computing systems, the media embodying logic that is operable when executed to:
   receive, from a client computing device, a request to access a remote client;
   select a first set of a plurality of pipeline components through which to provide the client computing device access to the remote client, comprising:
      select, based on one or more first factors, a first one of a plurality of capture computational resources, wherein the one or more first factors comprise one or more of a geographic location of the client computing device, a capacity of the plurality of capture computational resources, and a number of failed capabilities of the plurality of capture computational resources;
      lock the first one of the plurality of capture computational resources;
      lock the first one of the plurality of encode computational resources;
      lock the first one of the plurality of transmit computational resources;
      select, based on one or more second factors, a first one of a plurality of encode computational resources; and
      select, based on one or more third factors, a first one of a plurality of transmit computational resources;
   capture, from the remote client and using the selected first capture computational resource, content to be presented to one or more client computing devices;
   encode using the selected first encode computational resource the captured content to be presented to the one or more client computing devices, wherein the encoding processes and converts the captured content in a format to be presented to the one or more computing devices;
   transmit using the selected first transmit computational resource the encoded captured content to the one or more client computing systems.

9. The media of claim 8, wherein the remote client is a remote desktop.

10. The media of claim 8, wherein the remote client is controlled by the client computing device.

11. The media of claim 10, wherein the remote client is controlled by a second client computing device.

12. The media claim of 10, wherein each of the one or more client computing devices is associated with a particular user of the virtual-room networking system.

13. The media claim of 8, wherein the content to be presented to the one or more client computing devices contains one or more audio streams and one or more video streams.

14. A system, comprising:
   one or more memory devices; and
   a processor communicatively coupled to the one or more memory devices, the processor operable to:
      receive, from a client computing device, a request to access a remote client;
      select a first set of a plurality of pipeline components through which to provide the client computing device access to the remote client, comprising:
         select, based on one or more first factors, a first one of a plurality of capture computational resources, wherein the one or more first factors comprise one or more of a geographic location of the client computing device, a capacity of the plurality of capture computational resources, and a number of failed capabilities of the plurality of capture computational resources;
         lock the first one of the plurality of capture computational resources;
         lock the first one of the plurality of encode computational resources;
         lock the first one of the plurality of transmit computational resources;
         select, based on one or more second factors, a first one of a plurality of encode computational resources; and
         select, based on one or more third factors, a first one of a plurality of transmit computational resources;
      capture, from the remote client and using the selected first capture computational resource, content to be presented to one or more client computing devices;
      encode using the selected first encode computational resource the captured content to be presented to the one or more client computing devices, wherein the encoding processes and converts the captured content in a format to be presented to the one or more computing devices;
      transmit using the selected first transmit computational resource the encoded captured content to the one or more client computing systems.

15. The system claim 14, wherein the remote client is a remote desktop.

16. The system of claim 14, wherein the remote client is controlled by the client computing device.

17. The system of claim 16, wherein the remote client is controlled by a second client computing device.

18. The system claim 16, wherein each of the one or more client computing devices is associated with a particular user of the virtual-room networking system.

* * * * *